United States Patent
Chang

(10) Patent No.: US 9,542,402 B2
(45) Date of Patent: Jan. 10, 2017

(54) COMPUTING DEVICES WITH MULTI-LAYER FILE SYSTEMS

(71) Applicant: Empire Technology Development LLC, Wilmington, DE (US)

(72) Inventor: Hui Huang Chang, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 230 days.

(21) Appl. No.: 14/000,527

(22) PCT Filed: Apr. 24, 2013

(86) PCT No.: PCT/US2013/038033
§ 371 (c)(1),
(2) Date: Aug. 20, 2013

(87) PCT Pub. No.: WO2014/175880
PCT Pub. Date: Oct. 30, 2014

(65) Prior Publication Data
US 2014/0324804 A1    Oct. 30, 2014

(51) Int. Cl.
*G06F 7/00* (2006.01)
*G06F 17/30* (2006.01)
(52) U.S. Cl.
CPC ... *G06F 17/30091* (2013.01); *G06F 17/30336* (2013.01)
(58) Field of Classification Search
CPC .............. G06F 17/30091; G06F 17/30336
See application file for complete search history.

(56) References Cited

U.S. PATENT DOCUMENTS

| 5,165,026 A | * | 11/1992 | Kusakabe | G05B 19/05 700/3 |
| 5,253,343 A | * | 10/1993 | Grave | G05B 19/0421 710/113 |
| 5,598,519 A | * | 1/1997 | Narayanan | G06F 17/246 707/999.003 |
| 5,671,406 A | * | 9/1997 | Lubbers | G06F 17/30958 707/696 |
| 6,397,311 B1 | * | 5/2002 | Capps | G06F 3/0601 707/E17.01 |

(Continued)

FOREIGN PATENT DOCUMENTS

JP    09-259089    10/1997

OTHER PUBLICATIONS

International Search Report and Written Opinion from International Application No. PCT/US13/38033 mailed May 24, 2013.

(Continued)

*Primary Examiner* — Daniel Kuddus
(74) *Attorney, Agent, or Firm* — Brundidge & Stanger, P.C.

(57) ABSTRACT

Technologies are generally described for a multi-layer file system. In the multi-layer file system, a file is arranged into two or more data blocks respectively associated with corresponding multi-entry file indices. Each multi-entry file index can point to a location index at the beginning of a linked list (an initial entry in the linked list). The linked list may have at least one location index as an entry to identify a location in the storage device where the associated data block is stored.

22 Claims, 9 Drawing Sheets

(56) References Cited

U.S. PATENT DOCUMENTS

| | | | | |
|---|---|---|---|---|
| 6,427,123 | B1* | 7/2002 | Sedlar | G06F 17/30595 |
| | | | | 702/2 |
| 6,516,320 | B1* | 2/2003 | Odom | G06F 17/30955 |
| | | | | 707/747 |
| 6,529,913 | B1* | 3/2003 | Doig | G06F 17/30324 |
| | | | | 707/999.101 |
| 6,647,386 | B2* | 11/2003 | Hollines, III | G06F 17/30327 |
| 6,721,677 | B2* | 4/2004 | Pierce | G05B 23/0264 |
| | | | | 702/127 |
| 7,505,960 | B2* | 3/2009 | Travison | G06F 17/30327 |
| 7,508,419 | B2* | 3/2009 | Toyama | G06F 17/30265 |
| | | | | 348/207.1 |
| 7,627,609 | B1* | 12/2009 | Ozekinci | G06F 11/1458 |
| 7,698,325 | B1* | 4/2010 | Ozekinci | G06F 17/30321 |
| | | | | 707/698 |
| 7,801,881 | B1* | 9/2010 | Brawer | G06F 17/30864 |
| | | | | 707/709 |
| 7,925,641 | B2* | 4/2011 | Albrecht et al. | 707/711 |
| 8,001,088 | B2* | 8/2011 | Tawa, Jr. | G06F 17/30067 |
| | | | | 707/673 |
| 8,019,789 | B2* | 9/2011 | Dahms | G06F 9/4435 |
| | | | | 707/705 |
| 8,131,696 | B2* | 3/2012 | Chandrasekaran | G06F 9/542 |
| | | | | 707/705 |
| 2003/0005233 | A1* | 1/2003 | Stewart | G06F 12/123 |
| | | | | 711/136 |
| 2007/0118547 | A1* | 5/2007 | Gupta | G06F 17/30336 |
| 2008/0192754 | A1* | 8/2008 | Ku | H04L 45/00 |
| | | | | 370/395.32 |
| 2008/0216007 | A1* | 9/2008 | Brockbank | G01R 31/2844 |
| | | | | 715/771 |
| 2010/0205160 | A1* | 8/2010 | Kumar | G06F 17/30336 |
| | | | | 707/696 |
| 2012/0109985 | A1* | 5/2012 | Chandrasekaran | G06F 17/30584 |
| | | | | 707/754 |
| 2013/0262438 | A1* | 10/2013 | Palay | G06F 17/30312 |
| | | | | 707/722 |

OTHER PUBLICATIONS

"The Umbrella File System: Storage Management Across Heterogeneous Devices" by John Garrison, May 2010.
"Performance Characterization Lustre File System Based Upon Intel Solid State Disks" by M. Hebenstreit, et al., 2010.
"Stackable Layers: An Architecture for File System Development" by J. Heidemann, 2011.
"DFS: A File System for Virtualized Flash Storage" by W. K. Josephson, et al.

* cited by examiner

COMPUTING DEVICES WITH MULTI-LAYER FILE SYSTEMS

BACKGROUND

Unless otherwise indicated herein, the materials described in this section are not prior art to the claims in this application and are not admitted to be prior art by inclusion in this section.

File systems in computing devices are designed to organize data by defining procedures to store, retrieve, and/or update data in hard drives, optical drives, solid state devices ("SSD"), or other computer readable storage. For example, in existing file systems, such as FAT32 and NTFS, data can be organized as files in hierarchical directories. The file systems track the files and/or directories with corresponding physical locations in a storage device to facilitate reading, writing, or performing other suitable file functions.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
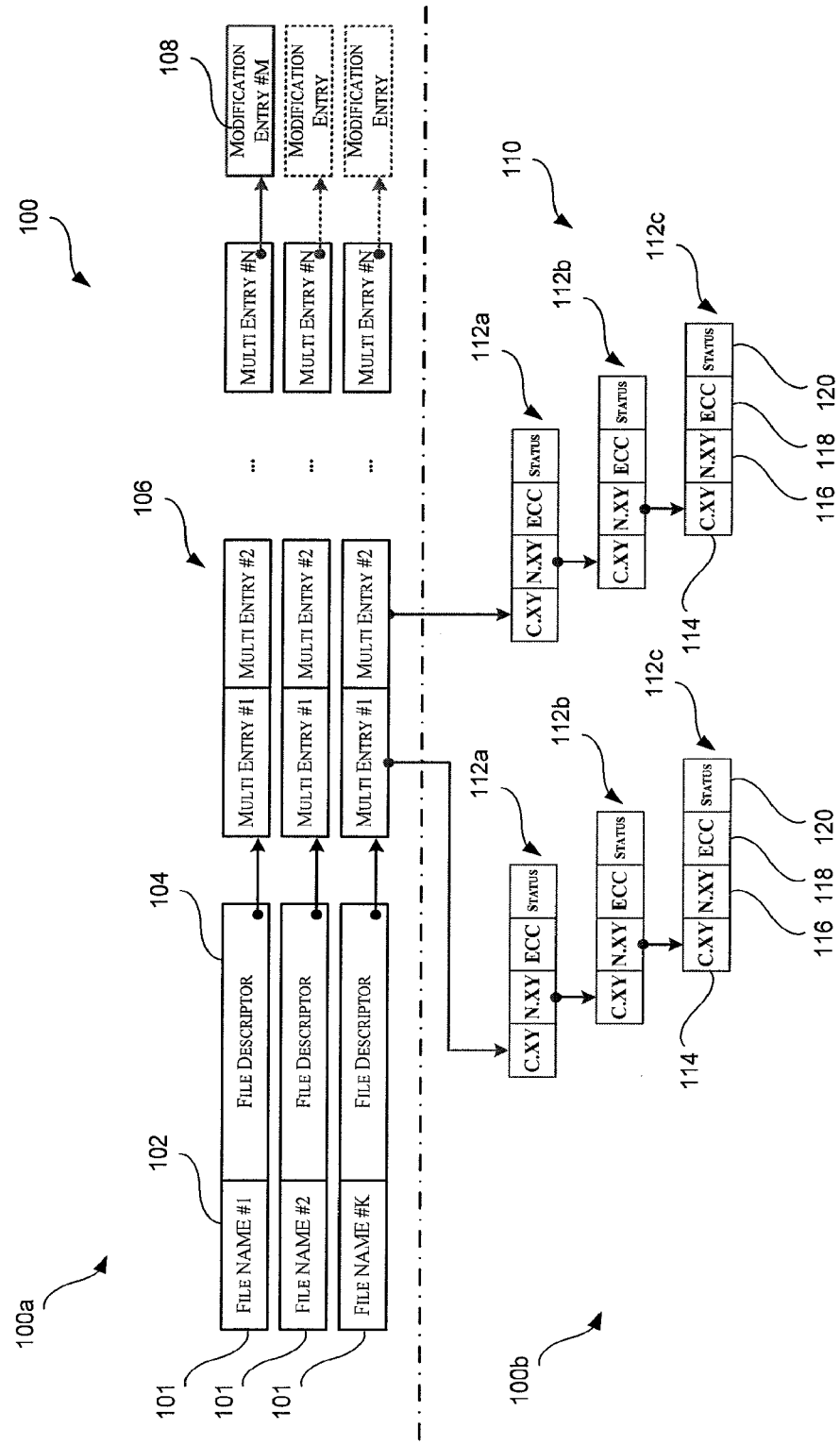
FIG. 1 is a block diagram illustrating an organization of an example multi-layer file system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to multi-layer file systems.

In general, a multi-layer file system may be provided for file management in computing devices. In the multi-layer file system, a file may be arranged into two or more data blocks each associated with corresponding multi-entry file indices. Each multi-entry file index can then be associated with a location index in a linked list. Each linked list may have at least one location index for identifying a location in a storage device at which the corresponding data block may be found.

FIG. 1 is a block diagram illustrating an organization of an example multi-layer file system 100 arranged in accordance with at least some embodiments of the present disclosure. In some embodiments, the multi-layer file system 100 may be utilized by an operating system of a computing device to access files stored in hard drives, optical drives, SSDs, and/or other storage devices. In certain embodiments, the multi-layer file system 100 may be implemented in association with hard drives, optical drives, SSDs, and/or other storage devices. An example storage device is described below with reference to FIG. 2. In other embodiments, the multi-layer file system 100 may also be implemented in desktop computers, laptop computers, smart phones, tablet computers, and/or other suitable computing devices.

As shown in FIG. 1, the multi-layer file system 100 can include a plurality of files 101. In the illustrated embodiment, three files 101 are shown in FIG. 1 for illustration purposes. In other embodiments, the multi-layer file system 100 may include any suitable number of files 101. In further embodiments, the multi-layer file system 100 can also include directories, subdirectories, root directories, and/or other suitable organizational structures or components.

As shown in FIG. 1, multiple files 101 stored in the multi-layer file system 100 can be organized in a linked type of data structure. The linked data structure can be implemented as pointers, linked-lists, cursors, indices, or any other appropriate type of linking data structure. For simplicity, the linking structure will be described below with references to indices, but any other suitable linking structure is also contemplated. For example, each file 101 may include various data fields at least some of which are linked. In the illustrated embodiment in FIG. 1, each file 101 can include a File Name field 102, a File Descriptor field 104, and a plurality of Multi-Entry File Indices 106 (shown as Multi Entry Multi Entry #2, ..., Multi Entry #N, where N is a positive integer) individually linked to a linked list 110. The File Name fields 102, the File Descriptor fields 104 and the Multi-Entry File Indices 106 can form a data layer 110a in the multi-layer file system 100, and the linked lists 110 can form another data layer 110b in the multi-layer file system 100. It should be noted that the number of data layers in the multi-layer file system 100 is not limited to two in the concept of the present disclosure. The File Name field 102 may contain an alphanumerical string corresponding to a title for the file 101. Optionally, each file 101 may also include a Modification Entry 108 (also in the data layer formed by the File Name field 102, the File Descriptor field 104 and the Multi-Entry File Indices 106) for certain device operations, as will be described in more detail below with reference to FIG. 9. In further embodiments, each file 101 may also include a file date, a file size, a modification date, a status flag, and/or other suitable indices or data fields, which can be also in the data layer formed by the File Name field 102, the File Descriptor field 104 and the Multi-Entry File Indices 106.

In certain embodiments, the File Name field 102, the File Descriptor field 104, the Multi-Entry File Indices 106 may be maintained by an operating system of a computing device (not shown) while the linked lists 110 can be maintained by a storage device. In other embodiments, all of the foregoing data fields may be maintained by the storage device, as described below with reference to FIGS. 2 and 3. In further embodiments, at least one of the foregoing data fields may be maintained by other suitable components.

The File Descriptor field 104 of each file 101 can contain a text string of a suitable length (e.g., 32 characters) that represents a brief description (such as size, author, created date, modified date, etc.) of the file 101. In one embodiment, the File Descriptor field 104 can also include one or more pointers associated with each of the Multi-Entry File Indices 106. For example, the File Descriptor field 104 can include N pointers that each can be linked to a respective one of Multi Entry #1, Multi Entry #2, . . . , Multi Entry #N. In other examples, the File Descriptor field 104 may include one pointer linked to Multi Entry #1, which may be linked to Multi Entry #2, . . . , Multi Entry #N in a sequential arrangement. In further embodiments, the File Descriptor field 104 may be linked to the Multi Entry File Indices 106 in other suitable manners.

The Multi-Entry File Indices 106 can individually include pointers linked to the linked list 110 to identify physical locations in the storage device. For example, as shown in FIG. 1, the linked list 110 can include one or more location indices 112 (identified individually as first, second, and third location indices 112a, 112b, and 112c, respectively) that each may identify a location in the storage device that contains the corresponding data block. Though three location indices 112 are shown in FIG. 1, in other embodiments, the linked list 110 can include any suitable number of location indices 112.

In the illustrated embodiment shown in FIG. 1, each location index 112 can include a current location pointer 114 (C.XY) that references a location in the storage device and a next entry pointer 116 (N.XY) that references a subsequent location index 112. For example, the current location pointer 114 of the first location index 112a may identify a first location in the storage device. The next entry pointer 116 of the first location index 112a may identify the second location index 112b, which has a corresponding current location pointer 114 that may reference a second location in the storage device. Similarly, the next entry pointer 116 of the second location index 112b may identify the third location index 112c, which has a corresponding current location pointer 114 that may reference a third location in the storage device. Because the third location index 112c may be the last pointer in the linked list 110, the next entry pointer 116 of the third location index 112c may have a "NULL" value (e.g., $FFFF). In other embodiments, the linked list 110 and associated location indices 112 may have a nested, cascaded, and/or other suitable type of arrangement.

In certain embodiments, each location index 112 may optionally include an Error Correction Code (ECC) field 118 associated with the data segment in the corresponding location. Each location index 112 may also optionally include a STATUS field 120 that includes a value to indicate a status of the data corresponding to the location index 112. The value of the STATUS field 120 may contain information to link a modified data segment in conjunction with the Modification-Entry File Indices 108, which may be utilized to record failure rates of the corresponding data, and/or for other suitable functions.

Even though the linked lists 110 are illustrated in FIG. 1 as the linking structures, in other embodiments, the linking structures may include other suitable data structures. For example, the first, second, and third location indices 112a, 112b, and 112c may be arranged in parallel, and individually linked to one of the Multi Entry File Indices 106. In other example, the linking structures may individually include a single location index 112. In further examples, the linking structures may include a plurality of Multi Entry File Indices 106 individually linked to additional subordinate file indices (not shown).

Figure 2:
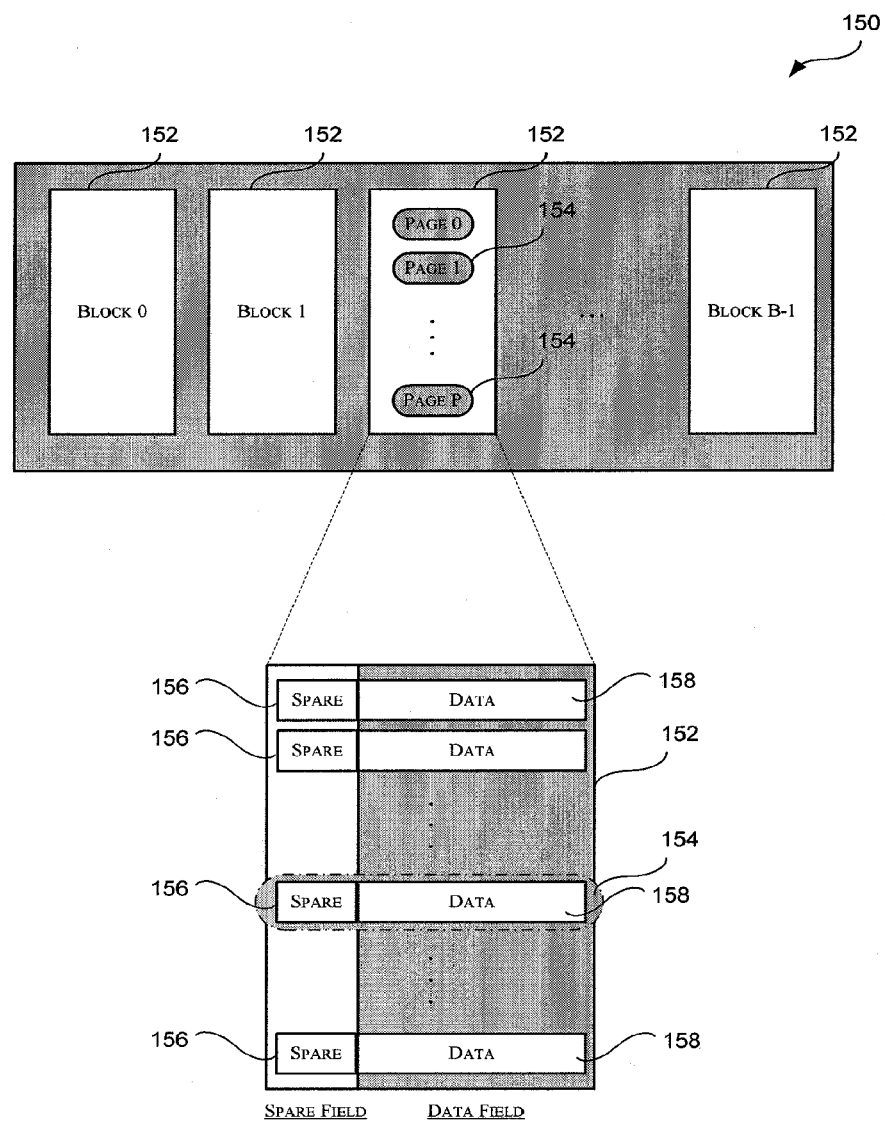
FIG. 2 is a block diagram illustrating a data organization of an example storage device.

FIG. 2 is a block diagram illustrating an example storage device 150 configured in accordance with various embodiments of the multi-layer file system 100 in FIG. 1. The storage device 150 can include one or more hard drives, optical drives, SSDs, or other types of storage media. As shown in FIG. 2, data can be organized into various Blocks 152 (Block 0, Block 1, . . . , Block B-1) in the storage device 150. Each Block 152 may be organized in one or more Pages 154 (Page 0-Page P), and each Page 154 can include a spare region 156 and a data region 158. The spare region 156 can include various bits or bytes of information (e.g., a couple tens of bytes) of any suitable sizes. In some examples, the spare region 156 can be used to store information that may be used for error correction, such as an ECC field 118 (FIG. 1) or for any other suitable purposes. In other embodiments, the Page 154 can also include additional and/or different regions.

Figure 3:
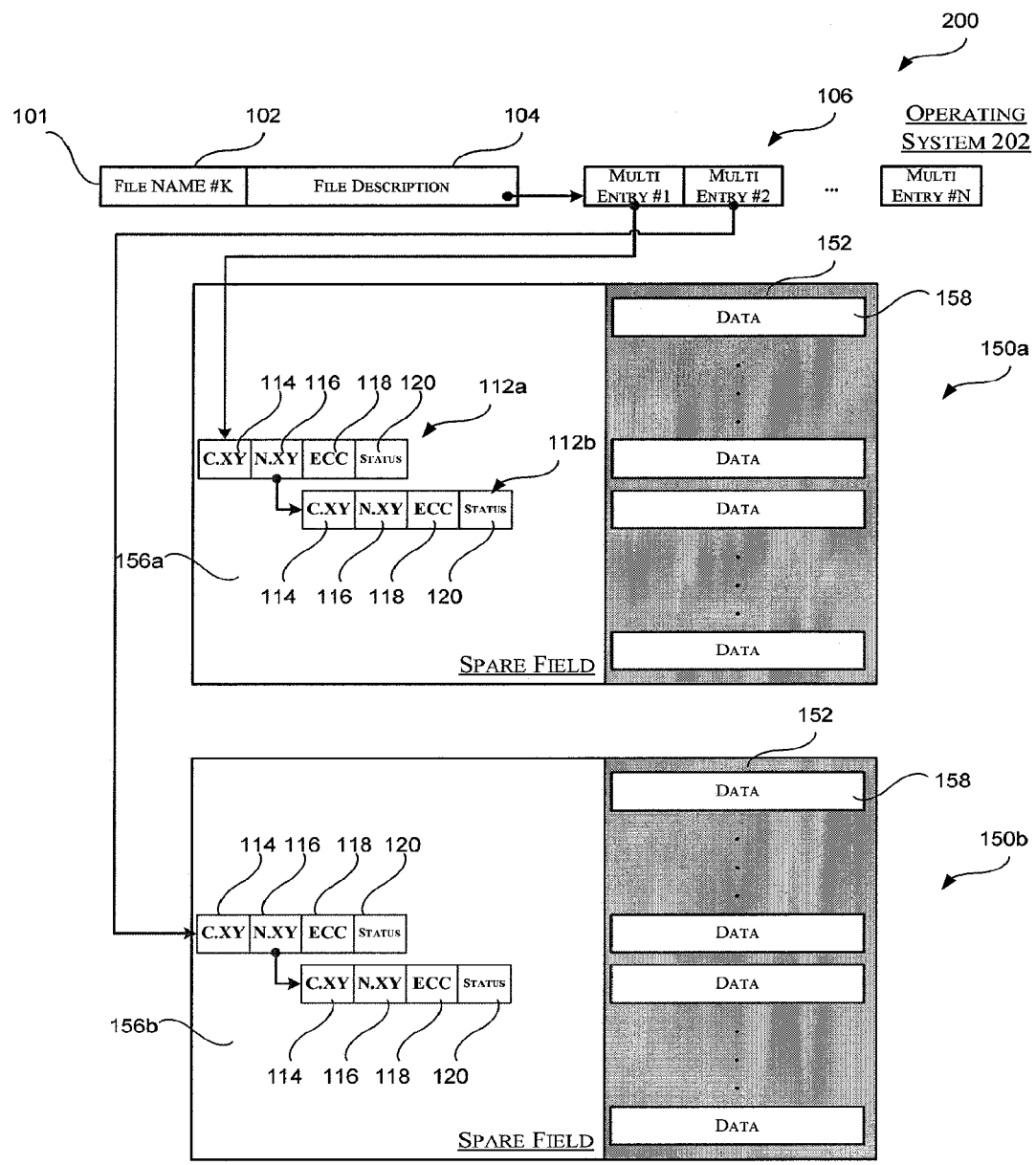
FIGS. 3-5 are block diagrams showing example computing systems implementing of the multi-layer file system of FIG. 1.
Figure 4:
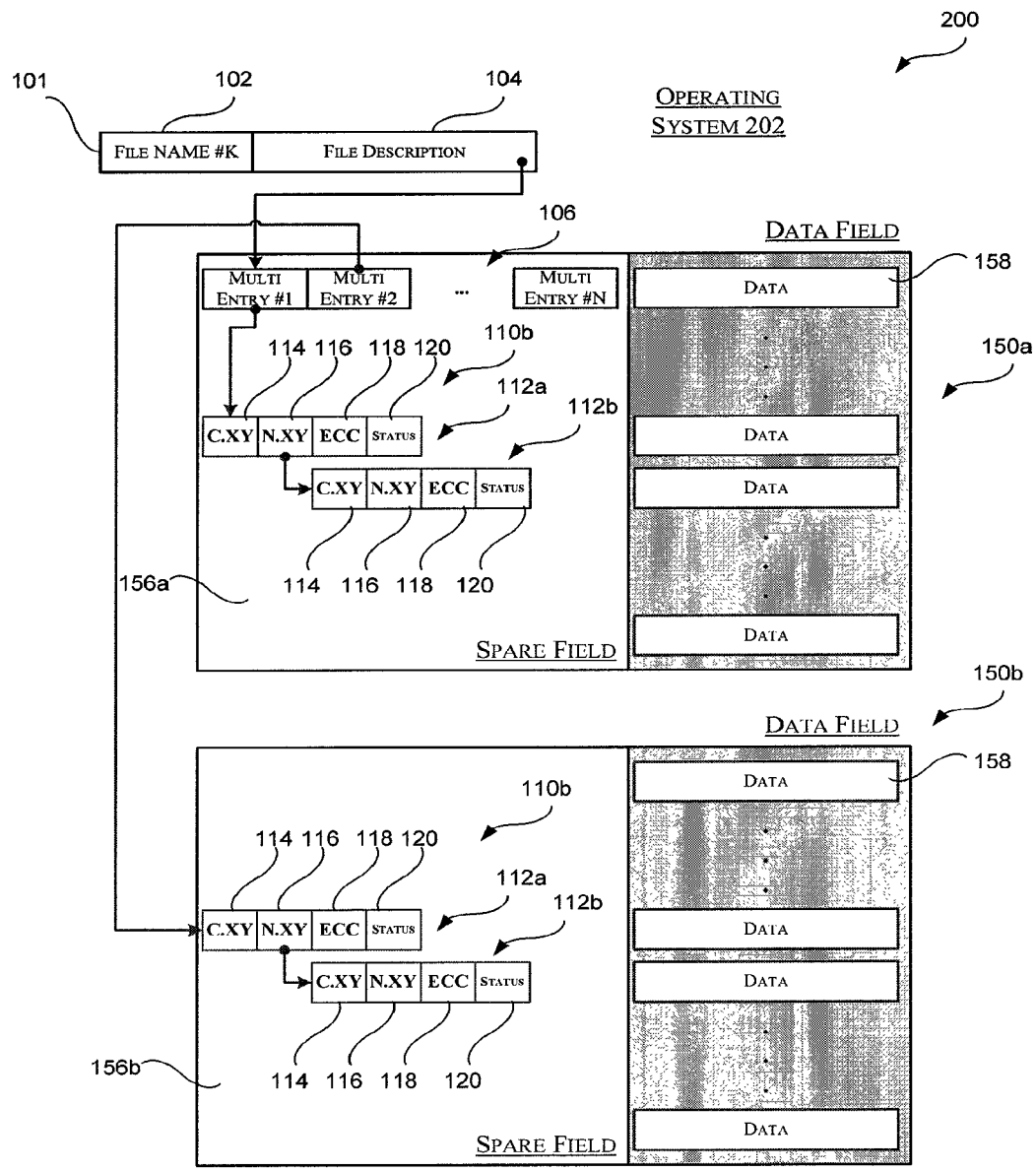

In certain embodiments, the linked list 110 (FIG. 1) of the multi-layer file system 100 can be implemented at least in part in the spare region 156 of the storage device 150. FIG. 3 is a block diagram showing an example computing system 200 implementing the multi-layer file system 100 of FIG. 1 according to various aspects of the present disclosure. As shown in FIG. 3, the computing system 200 can include an operating system 202 that is configured to manage the File Descriptor field 104, and the Multi-Entry File Indices 106 of the file system 100. The computing system 200 also includes a first storage device 150a and a second storage device 150b. The spare region 156a of the first storage device 150a maintains the locations indices 112 of the linked list 110 corresponding to the Multi Entry #1 of the file 101. The spare region 156b of the second storage device 150b is utilized to maintain the location indices 112 of the linked list 110, which correspond to the Multi Entry #2 of the file 101. In other embodiments, the Multi-Entry File Indices 106 can also be stored in the spare region 156a of the first storage device 150a, as shown in FIG. 4. In further embodiments, other suitable data fields of each file 101 may also be stored in the spare region 156a of the first storage device 150a.

Referring to both FIGS. 3 and 4, in operation, when the operating system 202 receives a command from a user or application for read, write, and/or other file operations, the operating system 202 locates the File Name field 102 and the File Descriptor field 104 of the file 101. Using the pointers in the File Descriptor field 104, the operating system 202 can locate corresponding Multi Entry File Indices 106 (e.g., Multi Entries #1 and #2). In the illustrated embodiment, the Multi Entry #1 references the current location pointer 114 of the first location index 112a in the first storage device 150a, and the Multi Entry #2 references to the current location pointer 114 of the first location index 112a in the first storage device 150a. In response, data in the data region 158 associated with the current location pointer 114 in both the first and second storage devices 150a and 150b may be are read, written, or otherwise manipulated generally in parallel or in sequence.

Figure 5:
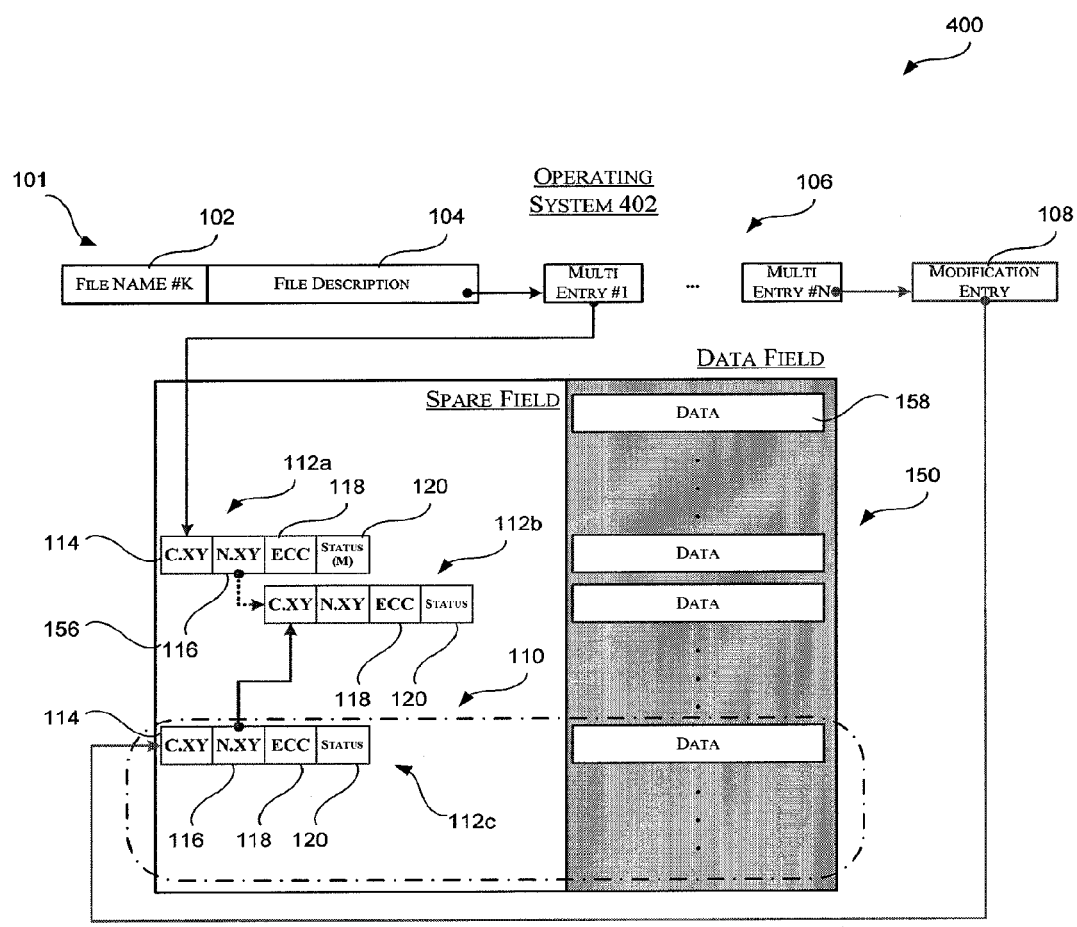

FIG. 5 is a block diagram showing an example computing system 400 implementing the multi-layer file system 100 of FIG. 1 with an optional Modification Entry 108 according to at least some examples of the present disclosure. As shown in FIG. 5, the computing system 400 is generally similar to the computing system 200 in FIG. 2 except the operating system 402 also illustrates a Modification Entry 108. In the illustrated embodiment, the Modification Entry 108 is linked to the third location index 112c in the spare region 156 for illustration purposes. In other embodiments, the Modification Entry 108 may be linked to the first, second, or any other suitable location indices 112. In further embodiments, the computing system 400 may include two, three, or any other suitable number of Modification Entries 108.

The Modification Entry 108 can be utilized to skip, alter, and/or otherwise modify the sequence of traversing the linked list 110. For example, as shown in FIG. 5, the next entry pointer 116 of the first location index 112a may normally be linked to the current location pointer 114 of the second location index 112b. As a result, in operation, the data blocks 158 corresponding to the first and second location indices 112a and 112b may be sequentially accessed. However, as shown in FIG. 5, the Modification Entry 108 can be set (e.g., by setting the STATUS field 120 with a "MODIFIED" flag) to indicate that the first location index 112a may be linked to the third location index 112c (modification location index), which is subsequently linked to the second location index 112b. Thus, the data blocks 158 corresponding to the first, third, and second locations indices 112a, 112c, and 112b may now be sequentially accessed by the operating system 402 using the Modification Entry 108. In other examples, the Modification Entry 108 may be set to indicate that the third location index 112c is not linked to the second location index 112b. As a result, the data block 158 corresponding to the second location index 112b may be omitted during file access by the operating system 402.

During a read operation, for each location index 112, a corresponding STATUS field 120 may be evaluated by the operating system 402. If the STATUS field 120 indicates a "MODIFIED" status, a Modification Entry 108 associated with the file may be identified sequentially, or in other suitable manners. In certain embodiments, the STATUS field 120 may also indicate a number of the Modification Entries 108 corresponding to the location index 112. Similar to each of Multi-Entry File Indices 106, the Modification Entry 108 can also be linked to a modification location index as an initial entry in a modification linked list. The modification linked list may include at least one modification location index as an entry for identifying a location in the storage device where modified data associated with the file is stored. Then, the modified data associated with the file may be accessed by the operating system 402 beginning at a location identified by the initial entry of the modification linked list and continuing to process any subsequent entries in the modification linked list.

Similar to each location index, each modification location index may include a current location pointer that references to a location in the storage device corresponding to the modification location index; and a next entry pointer may reference a modification location index at a subsequent entry to the modification location index in the modification linked list. A next entry pointer of the last modification location index in the modification linked list may reference a location index in the linked list or "NULL". "NULL" may have a reserve value such as $FFFF (un-programmed) to indicate the end of the corresponding data block/link list. If the referenced location corresponds to a value of "NULL," then the data corresponding to the location index may be ignored. If the modification location index is utilized to inserting some data, the "MODIFIED" flag can be set in a STATUS field of a next location index after the insertion point, or, the data corresponding to the location index can be repeated before the inserted contents.

During a write operation, a location index 112 for identifying a location relevant to a portion of the data block in a storage device may be identified by the operating system 402. Then, a STATUS field 120 of the identified location index 112 may be set to a value of "MODIFIED." Thereafter, a Modification Entry 108 associated with a modified portion of the data block may be created sequentially, or in other suitable manners utilized by the operating system 402. Subsequently, modified data associated with the Modification Entry 108 may be written into data blocks by the operating system 402 following generally similar procedures as discussed above with reference to the read operation.

By utilizing the Modification Entry 108, data insertion, data deletion, data modification, and/or other suitable data operations may be performed by the operating system 402 without rewriting pertinent data. Instead, a "MODIFIED" flag may be set, and by using a Modification-Entry File Index, the modified data may be effectively written into a modification linked list 110 corresponding to the Modification Entry 108. Therefore, rewrite operations may be reduced or possibly avoided.

Figure 6:
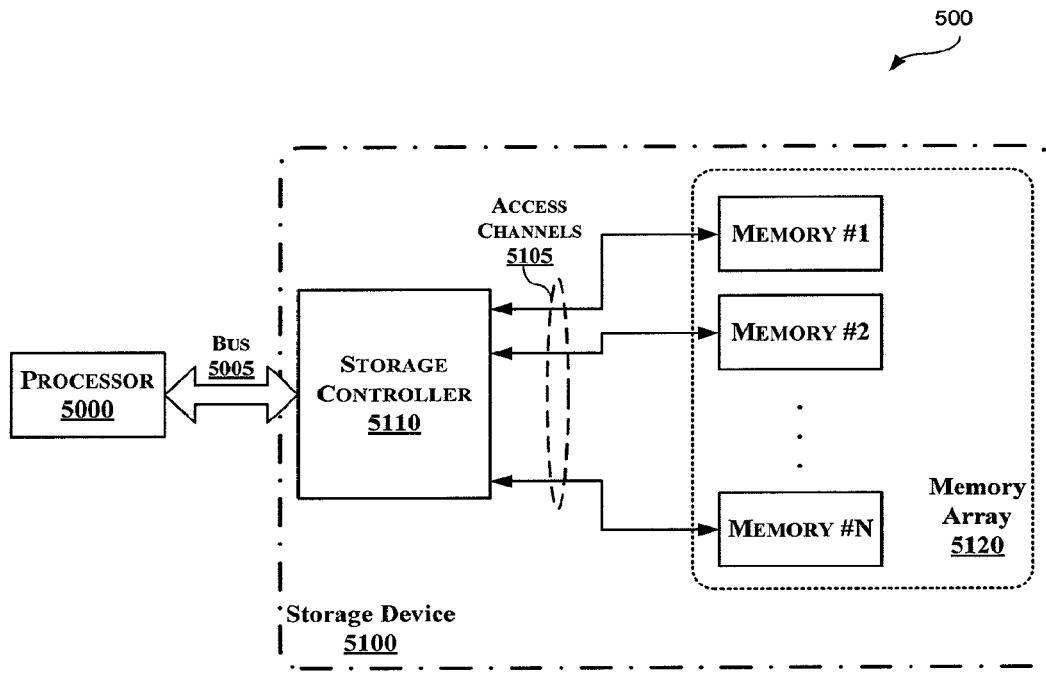
FIGS. 6 and 7 are block diagrams illustrating example hardware file systems.
Figure 7:
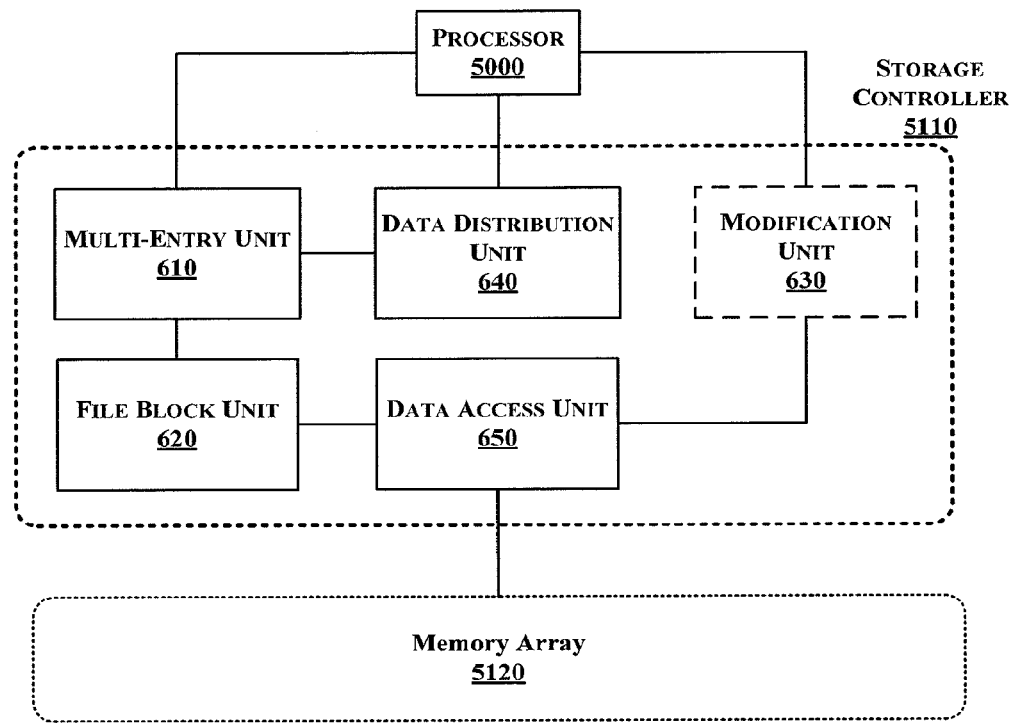

FIGS. 6 and 7 are block diagrams illustrating hardware components of an example computing system 500 incorporating the multi-layer file system 100 of FIG. 1 according to at least some examples of the present disclosure. As shown in FIG. 6, the computing system 500 can include a processor 5000 and a storage device 5100 (e.g., an SSD). The storage device 5100 may include a storage controller 5110 and a memory array 5120 having a number (N) of memory devices (e.g., flash memories, shown as Memory #1, Memory #2, . . . , Memory #N). The processor 5000 may be coupled to the storage controller 5110 via a communication bus 5005, and configured to send/receive instructions and/or data to/from the storage controller 5110 over the communication bus 5005. The storage controller 5110 may be coupled to each of the Memory #1, Memory #2, . . . , Memory #N via an access channel 5105, and configured to send/receive data to/from each of the memories.

As shown in FIG. 7, in certain embodiments, the storage controller 5110 may include a multi-entry unit 610, a file block unit 620, a data distribution unit 640, a data access unit 650, and optionally a modification unit 630, which may be operatively coupled to one another. The foregoing components of the storage controller 5110 may be implemented and/or configured by utilizing hardware components (e.g., ASICs) and/or software components (e.g., firmware). Each of the depicted components may be implemented as physical or logical partitions with respect to one another, divided into more partitions, or combined into fewer partitions as may be preferred in various embodiments. In some embodiments, the multi-entry unit 610 may be configured to identify two or more (e.g., N) multi-entry file indices associated with a file. The file block unit 620 may be configured to, for each identified multi-entry file index, identify a location index corresponding to the multi-entry file index. As described in conjunction with FIG. 1, the location index can be an initial entry in a linked list, and the linked list has at least one location index for identifying a location in the storage device 5100 holding data associated with the file. The data access unit 650 may be configured to, for each linked list, retrieve and/or write the data block from and/or into the storage device. The data distribution unit 640 may be configured to divide data associated with a file into two or more data blocks. The multi-entry unit 610 may then be configured to, for each data block, create a multi-entry file index that references a location index of a linked list. The modification unit 630 may be configured to skip, alter, and/or otherwise modify the sequence of traversing the linked list, as described above with reference to FIG. 5. Various functions and operations of the foregoing components of the storage controller 5110 are described in more detail below with reference to FIGS. 8 and 9.

Figure 8:
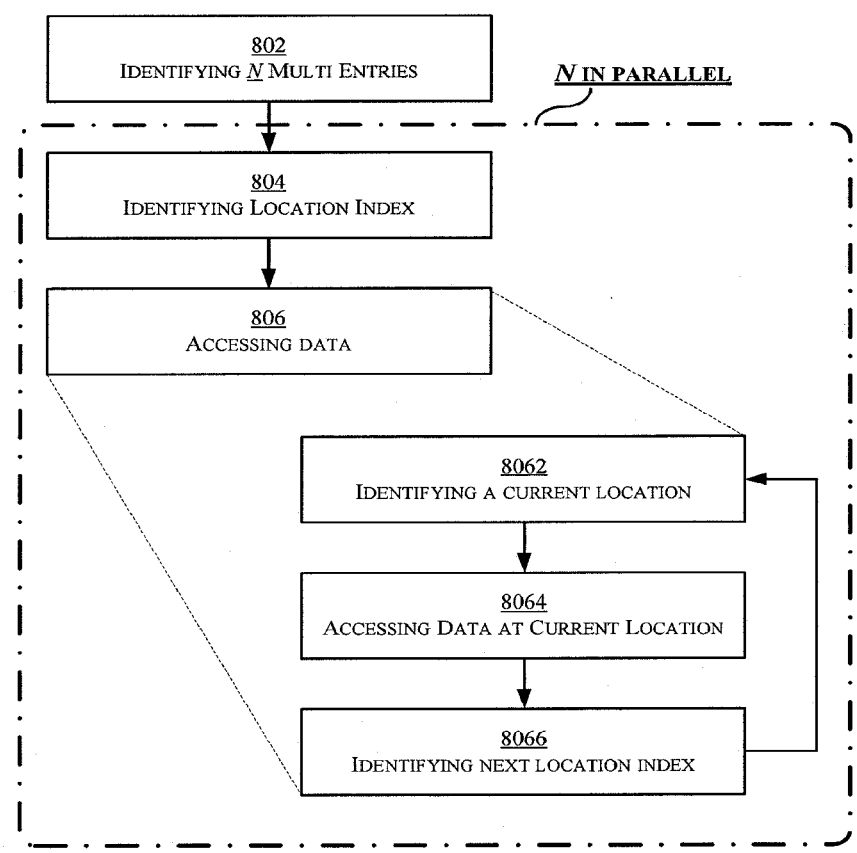
FIG. 8 is a flowchart illustrating an example method for processing a file in a computing device.

FIG. 8 is a flowchart illustrating an example method 800 to access a file in a computing device, arranged in accordance with at least some embodiments of the present disclosure. In certain embodiments, the storage controller 5110 (FIG. 6) may be operable to perform the method 800. In other embodiments, the processor 5000 (FIG. 6) may be configured via program instructions to perform the method 800. In further embodiments, other suitable computing devices and/or systems may be configured via machine executable instructions to perform the method 800.

The method 800 sets forth various functional blocks or actions that may be described as processing steps, functional operations, events and/or acts, etc., which may be performed by hardware, software, and/or firmware. Numerous alternatives to the functional blocks shown in FIG. 8 may be practiced in various implementations. For example, intervening actions not shown and/or additional actions not shown may be employed and/or some of the actions shown may be eliminated, without departing from the scope of claimed subject matter. The method 800 may include one or more of functional operations as indicated by one or more of blocks 802, 804, and/or 806. The process of the method 800 may begin at block 802.

At block 802, "IDENTIFYING N MULTI ENTRIES," N multi-entry file indices associated with a file may be generated and identified. In some examples, as described in conjunction with FIG. 1, an operating system may be configured via various instructions to identify the N multi-entry file indices identified with one or more pointers in a File Descriptor of the file. As a non-limiting example, the processor 5000 (FIG. 6) may be configured via machine executable instructions to identify the one or more pointers from the file system (such as FAT etc.) and send the identified pointers to the storage controller 5110 (FIG. 6) of the storage device 5100 (FIG. 6). In other examples, the processor 5000 may identify the one or more pointers from the file system (such as FAT etc.), identify N multi-entry file indices associated with the identified pointers, and then send the identified N multi-entry file indices to the storage controller 5110. The process of the method 800 may continue from block 802 to block 804.

The process of the method 800 may continue from block 802 to blocks 804 and 806. In some examples, blocks 804 and 806 may be performed in parallel for each of the N identified multi-entry file indices. At block 804, "IDENTIFYING LOCATION INDEX," a location index corresponding to the identified multi-entry file index may be identified. As described in conjunction with FIG. 1, the location index can be an initial entry in a linked list, and the linked list may have at least one location index as an entry to identify a location in the storage device 5100. Based on the identified location index, at block 806, "ACCESSING DATA," the data associated with the location index can be retrieved from memory. Thus, by performing the operations associated with Blocks 804 and 806, N parallel channels may be formed in the storage device 5100, thus resulting in higher data access rates than non-parallel techniques.

As shown in FIG. 8, the block 806, "ACCESSING DATA," can also include example operations identified in blocks 8062-8066. For example, at block 8062, "IDENTIFYING A CURRENT LOCATION," a location index (e.g., C.XY in FIG. 1) may be identified based on the location index. At block 8064, "ACCESSING DATA AT CURRENT LOCATION," read, write, erase, and/or other suitable data operations may be performed for the data block associated with the current location index. At block 8066, "IDENTIFYING NEXT LOCATION INDEX," the link list may be traversed to identify a new location index based on the next location index (e.g., N.XY in FIG. 1). The process in blocks 8062-8066 may then be repeated until the end of the link list is reached.

When the end of the linked list is reached, the number N of data blocks of the file have been accessed (e.g., read, erased, etc.). Then, the number N of data blocks may be combined to form the whole file data. The N data blocks may be in sequence or not in sequence. For example, the N data blocks may be in a linear arrangement, in an interleaved arrangement, or in other suitable arrangements. As an example for better understanding, with the symbols defined as follows, the applicable data arrangements can be described. K is the number of channels, m is the depth of each linked list (for simplicity, the linked lists have the same depth). Then, N=K*m. The arrangement of the N data blocks through K different channels can be as follows.

Example 1

Interleaved (Short Latency for the First Readout)

| | |
|---|---|
| Channel 0: | 0, K, 2K, 3K, . . . , (m − 1)*K |
| Channel 1: | 1, K + 1, 2K + 1, 3K + 1, . . . , (m − 1)*K + 1 |
| . . . | |
| Channel K − 1: | K − 1, 2K − 1, 3K − 1, . . . , m*K − 1 |

Example 2

Linear (Long Latency for the First Readout)

| | |
|---|---|
| Channel 0: | 0, 1, 2, 3, . . . , m − 1 |
| Channel 1: | m, m + 1, m + 2, . . . , 2m − 1 |
| . . . | |
| Channel K − 1: | (K − 1)*m, (K − 1)*m + 1, . . . , K*m − 1 |

Example 3

Hybrid (Depending on the Content Type and CPU Processing Speed)

| | Interleaved | Linear | Interleaved | Linear |
|---|---|---|---|---|
| Channel 0: | 0, 4, 8, 12, | 16, 17, 18, 19, | 32, 36, 40, 44, | . . . |
| Channel 1: | 1, 5, 9, 13, | 20, 21, 22, 23, | 33, 37, 41, 45, | . . . |
| Channel 2: | 2, 6, 10, 14, | 24, 25, 26, 27, | 34, 38, 42, 46, | . . . |
| Channel 3: | 3, 7, 11, 15, | 28, 29, 30, 31, | 35, 39, 43, 47, | . . . |

Example 4

Hybrid (Mosaic Arrangement (K=4))

|  | Interleaved | Linear |
|---|---|---|
| Channel 0: | 0, K, | 2K, 2K + 1, . . . 2K + m − 3 |
| Channel 1: | 1, K + 1, | 2K + m − 2, 2K + m − 1 . . . , 2K + 2m − 5 |
| . . . | | |
| Channel K − 1: | K − 1, 2K − 1, | 2K + (K − 1)*(m − 2), . . . , K*m − 1 |

With the hybrid data arrangements (such as Examples 3 and 4), the first portion of data can be read out with very short latency to reduce the idle time of CPU; and when the CPU processes the readout data portion, there are longer period for the data reading (larger block of data can be read). The ratio of the interleaved data portions and the linear data portions can be varied according to the CPU processing speed and/or the content type. The linear data addressing can ease the post data arrangement at the host side. This kind of data accessing pattern can be repeated based on the host data processing speed.

Figure 9:
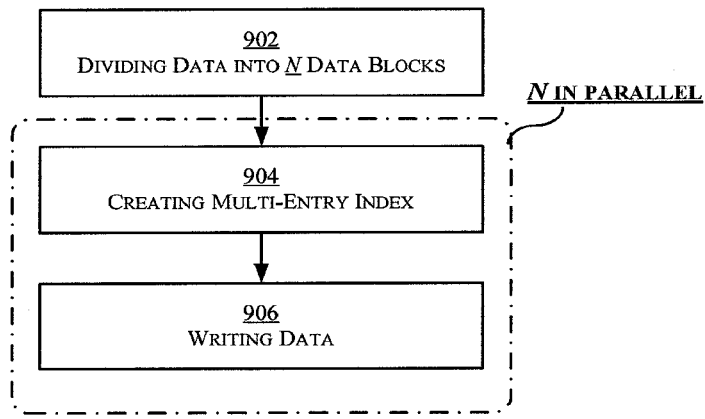
FIG. 9 is a flowchart illustrating another example method for storing a file in a computing device.

FIG. 9 is a flowchart illustrating an example method 900 to store a file in a computing device, arranged in accordance with at least some embodiments of the present disclosure. In certain embodiments, the storage controller 5110 (FIG. 6) may perform the method 900. In other embodiments, the processor 5000 (FIG. 6) may be configured via machine executable instructions to perform the method 900. In further embodiments, other suitable computing devices and/or systems may perform the method 900.

The method 900 sets forth various functional blocks or actions that may be described as processing steps, functional operations, events and/or acts, etc., which may be performed by hardware, software, and/or firmware. Numerous alternatives to the functional blocks shown in FIG. 9 may be practiced in various implementations. For example, intervening actions not shown and/or additional actions not shown may be employed and/or some of the actions shown may be eliminated, without departing from the scope of claimed subject matter. The method 900 may include one or more of functional operations as indicated by one or more of blocks 902, 904, and/or 906. The process of the method 900 may begin at block 902.

At block 902, "DIVIDING DATA INTO N DATA BLOCKS," N data blocks associated with a file may be formed. In some examples, as described in conjunction with FIG. 1, an operating system (e.g., executed by the processor 5000 in FIG. 6) may create a pointer for this file, and provide the created pointer to a storage device (e.g., the storage controller 5110 of the storage device 5100 in FIG. 6). In other examples, the processor 5000 may create the File Pointer for this file, divide the data into N data blocks, and then send these N data blocks to the storage controller 5110. The process of the method 900 may continue from block 902 to block 904.

In some examples, Blocks 904 and 906 may be performed in parallel for each of the N data blocks. At block 904, "CREATING MULTI-ENTRY INDEX," a multi-entry file index linked to a location index may be created. As described in conjunction with FIG. 1, the location index can be an initial entry in a linked list, and the linked list may have at least one location index as an entry for identifying a location in the storage device 5100. The process of the method 900 may continue from block 904 to block 906. At block 906, "WRITING DATA," the data associated with the file can be written into the storage device in N parallel channels. Similar to the operations associated with blocks 8062-8066, link lists may be traversed to write additional data blocks until the ends of the respective link lists is reached. When the ends are reached, the number N of data blocks of the whole file have been written.

Figure 10:
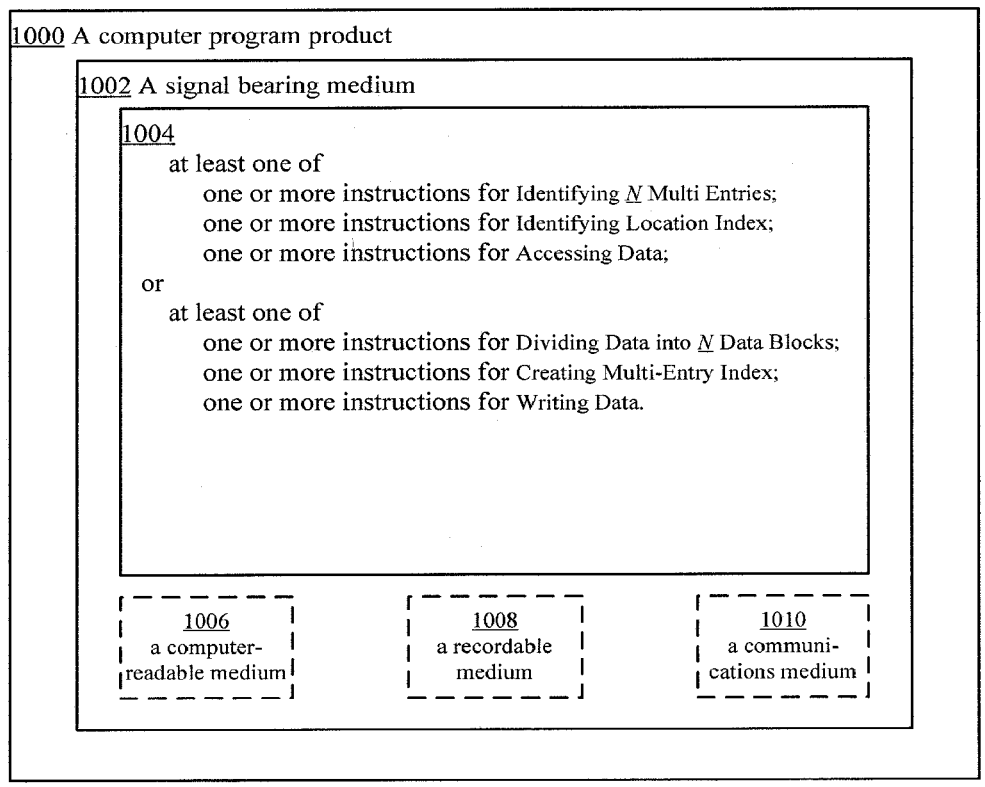
FIG. 10 is a schematic diagram illustrating an example computer program product.

FIG. 10 illustrates an example computer program product 1000 arranged in accordance with at least some examples of the present disclosure. Computer program product 1000 may include a signal bearing medium 1002. Signal bearing medium 1002 may include one or more instructions 1004 that, when executed by, for example, a processor, may provide the functionalities described above with respect to FIGS. 5-8. Thus, for example, referring to FIGS. 5 and/or 6, one or more of modules 610, 620, 630, 640 and/or 650 may undertake one or more of the blocks shown in FIGS. 7 and/or 8 in response to instructions 1004 conveyed to the processor 5000 and/or the SSD file controller 5110 by signal bearing medium 1002.

In some implementations, signal bearing medium 1002 may encompass a computer-readable medium 1006, such as, but not limited to, a hard disk drive, a Compact Disc (CD), a Digital Versatile Disk (DVD), a digital tape, memory, etc. In some implementations, signal bearing medium 1002 may encompass a recordable medium 1008, such as, but not limited to, memory, read/write (R/W) CDs, R/W DVDs, etc. In some implementations, signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, computer program product 1000 may be conveyed to one or more modules of the processor 5000 and/or the SSD file controller 5110 by an RF signal bearing medium 1002, where the signal bearing medium 1002 is conveyed by a wireless communications medium 1010 (e.g., a wireless communications medium conforming with the IEEE 802.11 standard).

Figure 11:
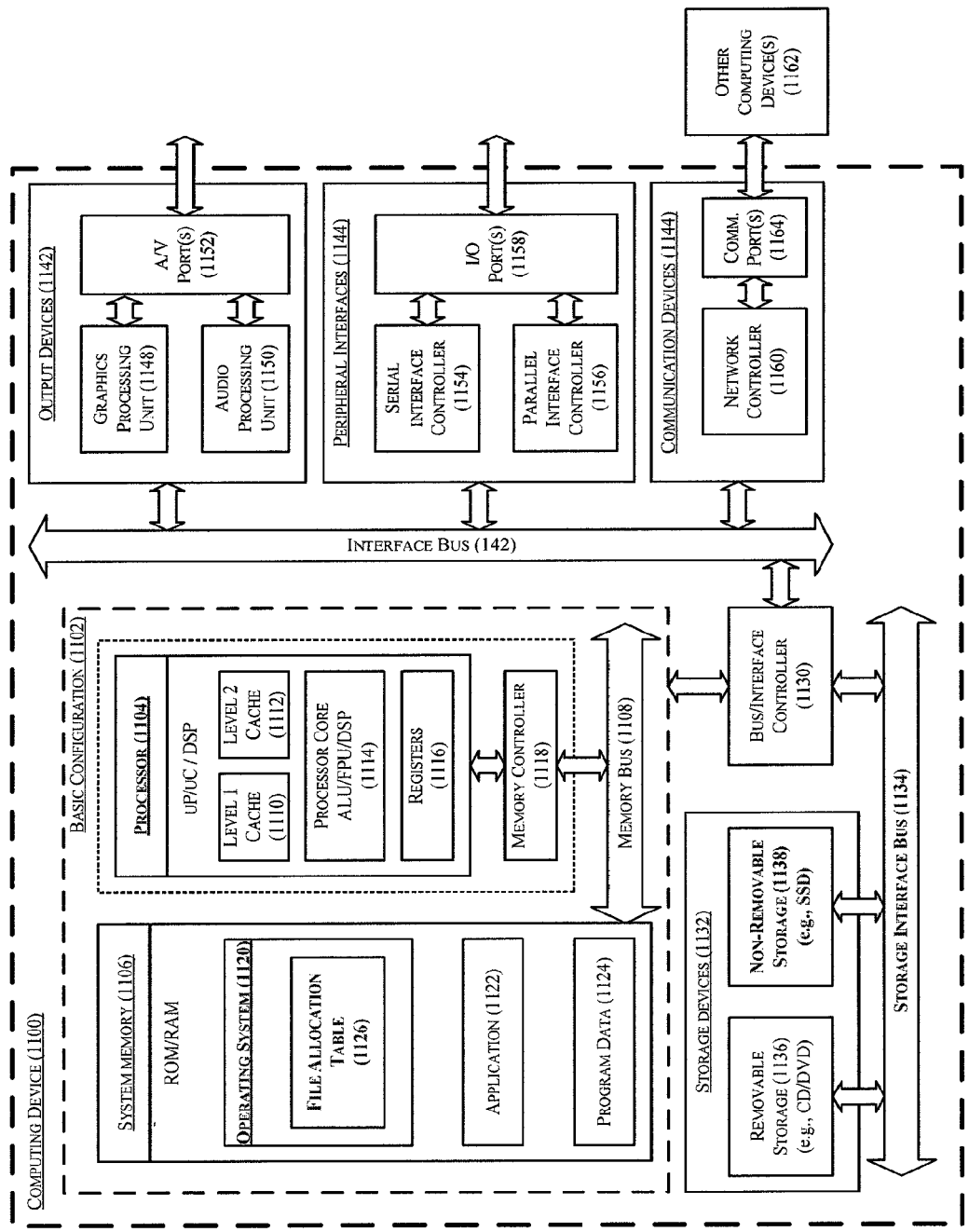
FIG. 11 illustrates a block diagram of an example computing device, all arranged according to at least some embodiments presented herein.

FIG. 11 is a block diagram illustrating an example computing device 1100 that is arranged for the multi-layer file system in accordance with the present disclosure. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor (μP), a microcontroller (μC), a digital signal processor (DSP), or any combination thereof. Processor 1104 may include one more levels of caching, such as a level one cache 1110 and a level two cache 1112, a processor core 1114, and registers 1116. An example processor core 1114 may include an arithmetic logic unit (ALU), a floating point unit (FPU), a digital signal processing core (DSP Core), or any combination thereof. An example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124. Operating system 1120 may include a File Allocation Table 1126 that is arranged for the multi-layer file system if necessary (such as the files 101). Application 1122 may include a file management application that is arranged to perform the data writing/retrieving operations as is described herein. Program data 1124 may include file data 1128 (such as, data blocks or segments read out and/or to be written) that may be useful for the data writing/retrieving operations as is described herein. This described basic configuration 1102 is illustrated in FIG. 11 by those components within the inner dashed line.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100. Herein, it is to be noted that the storage devices (such as SSD and/or other suitable removable or non-removable storage devices) may be also adapted in accordance with at least some embodiments of the present disclosure.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. An example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1100 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1100 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to access a file in a computing device having a storage controller configured to send and receive data to and from a storage device, respectively, the method comprising:
    identifying two or more multi-entry file indices associated with one or more pointers in a file descriptor of the file and maintained by an operating system of the computing device in a first data layer of a multi-layer file system;
    identifying a location index associated with each identified multi-entry file index,
        wherein the location index is an initial entry in a linked list maintained by the storage controller of the computing device in a second data layer of the multi-layer file system, and
        wherein the linked list has at least one location index as an entry to identify a location in the storage device that stores data associated with the file;
    identifying a modification-entry file index associated with the file for each identified multi-entry file index maintained by the operating system of the computing device in the first data layer,
        wherein the modification-entry file index identifies a modification location index which is an initial entry in a modification linked list maintained by the storage controller of the computing device in the second data layer, and
        wherein the modification linked list modifies a sequence of traversing entries in the linked list;
    evaluating a status field associated with each identified location index for a modification flag that indicates a modification to the sequence of traversing entries in the linked list;
    retrieving the data associated with the file in an order according to the modification linked list that modifies the sequence of traversing entries in the linked list; and
    organizing the data into a plurality of blocks, wherein:
        each block of the plurality of blocks is organized into one or more pages,
            each page of the one or more pages includes a spare region and a data region, and
        the spare region stores information that is utilized for error correction and to maintain location indices in the linked list.

2. The method of claim 1, wherein the identifying the modification-entry file index and the retrieving the data associated with the file are each performed in parallel for the identified multi-entry file indices.

3. The method of claim 1, wherein each location index comprises:
    a current location pointer that references a location in the storage device associated with the each location index; and
    a next entry pointer that references an entry subsequent to the each location index in the linked list or indicates an end of data to be retrieved.

4. The method of claim 1, wherein the identifying the modification-entry file index associated with the file includes identifying the modification-entry file index in accordance with the status field;
    wherein the modification linked list comprises a plurality of modification location indices as entries in the modification linked list, including at least one modification location index as an entry to identify the location in the storage device where the data associated with the file is stored; and
    wherein the retrieving the data associated with the file includes retrieving the data associated with the file beginning at a location identified by the initial entry in the modification linked list and continuing through any subsequent entries in the modification linked list.

5. The method of claim 4, wherein each modification location index comprises:

a current location pointer that references a location in the storage device associated with the each modification location index; and
    a next entry pointer that references an entry subsequent to the each modification location index in the modification linked list, wherein a next entry pointer of a last modification location index in the modification linked list references back to a location index in the linked list or indicates an end of data.

6. A method to store a file into a storage device in a computing device having a storage controller configured to send and receive data to and from the storage device, respectively, the method comprising:
    dividing data associated with the file into two or more data blocks, wherein:
        each block of the two or more data blocks is organized into one or more pages,
        each page of the one or more pages includes a spare region and a data region, and
        the spare region stores information that is utilized for error correction and to maintain location indices in a linked list;
    creating, for each data block, a multi-entry file index that is maintained by an operating system of the computing device in a first data layer of a multi-layer file system and that references a location index which is an initial entry in the linked list maintained by the storage controller of the computing device in a second data layer of the multi-layer file system,
        wherein the multi-entry file index is associated with a pointer in a file descriptor of the file, and
        wherein the linked list has at least one location index as an entry to identify a location in the storage device where the data block is to be stored;
    identifying a modification-entry file index associated with the file,
        wherein the modification-entry file index identifies a modification location index which is an initial entry in a modification linked list maintained by the storage controller of the computing device in the second data layer, and
        wherein the modification linked list modifies a sequence of traversing entries in the linked list;
    evaluating a status field associated with each location index for a modification flag that indicates a modification to the sequence of traversing entries in the linked list; and
        writing the data block into the storage device in an order according to the modification linked list that modifies the sequence of traversing entries in the linked list.

7. The method of claim 6, wherein each location index comprises:
    a current location pointer that references a location in the storage device associated with the each location index; and
    a next entry pointer that references an entry subsequent to the each location index in the linked list or indicates an end of the data block to be written.

8. The method of claim 6, further comprising:
    identifying a portion of the data block to be modified;
        identifying a location index that identifies a location in the storage device pertaining to the portion to be modified;
        setting the modification flag of the status field associated with the identified location index to indicate that the linked list is modified;
        creating the modification-entry file index associated with the portion to be modified, wherein the modification-entry file index references the modification location index which is the initial entry in the modification linked list, and the modification linked list comprises a plurality of modification location indices as entries in the modification linked list, including at least one modification location index as an entry to identify a location in the storage device where the modified portion is to be stored; and
    writing the modified portion of the data block into the storage device in an order according to the modification linked list that modifies the sequence of traversing entries in the linked list.

9. The method of claim 8, wherein the identified location index identifies the location where the portion to be modified is stored.

10. The method of claim 8, wherein the identified location index precedes a location index that identifies the location where the portion to be modified is stored.

11. The method of claim 8, wherein the identified location index follows a location index that identifies the location where the portion to be modified is stored.

12. The method of claim 8, wherein each modification location index comprises:
    a current location pointer that references a location in the storage device associated with the each modification location index; and
    a next entry pointer that references an entry subsequent to the each modification location index in the modification linked list,
    wherein a next entry pointer of a last modification location index in the modification linked list references back to a location index in the linked list or indicates an end of the modified portion of the data block.

13. A storage controller, comprising:
    a hardware processor;
    a data division unit coupled to the processor;
    a multi-entry file index creation unit coupled to the processor; and
    a data write unit coupled to the processor;
    the hardware processor configured to:
    control the data division unit to divide data associated with a file into two or more data blocks, wherein:
        each block of the two or more data blocks is organized into one or more pages,
        each page of the one or more pages includes a spare region and a data region, and
        the spare region stores information that is utilized for error correction and to maintain location indices in a linked list;
    control the multi-entry file index creation unit, for each data block, to create:
        a multi-entry file index that is maintained by an operating system of a computing device in a first data layer of a multi-layer file system and that references a location index which is an initial entry in the linked list that is maintained by the storage controller in a second data layer of the multi-layer file system, wherein the multi-entry file index is associated with a pointer in a file descriptor of the file, and wherein the linked list has at least one location index as an entry to identify a location in a storage device where the data block is to be stored, and wherein the computing device comprises the storage controller, and at least one modification-entry file index that identifies a modification location index which is an initial entry in a modification linked list maintained by the storage controller in the second data layer, wherein the modification linked list modifies a sequence of traversing entries in the linked list;

evaluate a status field associated with each identified location index for a modification flag that indicates a modification to the sequence of traversing entries in the linked list; and control the data write unit, for each linked list, to write the data block into the storage device in an order according to the modification linked list that modifies the sequence of traversing entries in the linked list.

14. The storage controller of claim 13, wherein the hardware processor is configured to:

control the multi-entry file index creation unit to create the multi-entry file indices for the two or more data blocks in parallel, and control the data write unit to write the data blocks in parallel for the respective linked list.

15. The storage controller of claim 13, wherein each location index comprises:

a current location pointer that references a location in the storage device associated with the each location index; and a next entry pointer that references an entry subsequent to the each location index in the linked list or indicates an end of the data block to be written.

16. The storage controller of claim 13, wherein the processor is configured to:

control a modification identification unit to identify a portion of the data block to be modified;

control a location index identification unit to identify a location index that identifies a location in the storage device pertaining to the portion to be modified;

control a status set unit to set the modification flag of the status field associated with the identified location index to indicate that the linked list is modified, control the multi-entry file index creation unit to create a modification-entry file index associated with the portion to be modified, wherein the modification-entry file index is configured to reference the modification location index which is the initial entry in the modification linked list, and the modification linked list comprises a plurality of modification location indices as entries in the modification linked list, including at least one modification location index as an entry to identify a location in the storage device where the modified portion of the data block is to be stored; and control the data write unit to write the modified portion of the data block into the storage device in an order according to the modification linked list that modifies the sequence of traversing entries in the linked list.

17. The storage controller of claim 16, wherein the identified location index identifies a location where the portion to be modified is stored.

18. The storage controller of claim 16, wherein the identified location index precedes a location index that identifies the location where the portion to be modified is stored.

19. The storage controller of claim 16, wherein the identified location index follows a location index that identifies the location where the portion to be modified is stored.

20. The storage controller of claim 16, wherein each modification location index comprises:

a current location pointer that references a location in the storage device associated with the each modification location index; and a next entry pointer that references an entry subsequent to the each modification location index in the modification linked list, wherein a next entry pointer of a last modification location index in the modification linked list references back to a location index in the linked list or indicates an end of the modified portion of the data block.

21. The storage controller of claim 13, wherein the storage device includes a solid state drive (SSD) device, and the storage controller includes an SSD controller.

22. The storage controller of claim 21, wherein the SSD device has two or more flash memories, a number of the two or more data blocks is equal to that of the two or more flash memories, and the two or more data blocks and the two or more flash memories are in one-to-one correspondence.

* * * * *